United States Patent
Ban et al.

(10) Patent No.: US 7,534,077 B2
(45) Date of Patent: May 19, 2009

(54) FINISHING MACHINE

(75) Inventors: Kazunori Ban, Yamanashi (JP); Takashi Sato, Yamanashi (JP); Kokoro Hatanaka, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 547 days.

(21) Appl. No.: 11/204,225

(22) Filed: Aug. 16, 2005

(65) Prior Publication Data

US 2006/0039768 A1 Feb. 23, 2006

(30) Foreign Application Priority Data

Aug. 17, 2004 (JP) ............................ 2004-237476

(51) Int. Cl.
*B23C 1/00* (2006.01)
(52) U.S. Cl. .................. 409/126; 409/79; 318/568.16; 318/568.22; 700/193
(58) Field of Classification Search ............ 318/568.11, 318/568.16, 568.19, 568.22; 700/161, 175, 700/193; 901/19, 23, 24, 41; 409/138–140, 409/126–127, 79–80, 186, 188, 193, 195; 451/236

See application file for complete search history.

(56) References Cited

U.S. PATENT DOCUMENTS

| | | | | | |
|---|---|---|---|---|---|
| 4,894,597 | A | * | 1/1990 | Ohtomi ................. | 318/568.22 |
| 4,993,896 | A | * | 2/1991 | Dombrowski et al. ....... | 409/138 |
| 5,312,212 | A | * | 5/1994 | Naumec .................... | 409/138 |
| 5,548,194 | A | * | 8/1996 | Hamura et al. ......... | 318/568.13 |
| 5,646,493 | A | * | 7/1997 | Hara et al. ............. | 318/568.17 |
| 5,675,229 | A | * | 10/1997 | Thorne ................... | 318/568.11 |
| 5,873,685 | A | * | 2/1999 | Yagi et al. ................... | 409/132 |
| 2003/0099522 | A1 | * | 5/2003 | Laempe ..................... | 409/224 |

(Continued)

FOREIGN PATENT DOCUMENTS

CN 1426342 6/2003

(Continued)

OTHER PUBLICATIONS

USPTO manual translation of JP 2004-50300, translated Dec. 2008.*

(Continued)

*Primary Examiner*—Daniel W Howell
(74) *Attorney, Agent, or Firm*—Staas & Halsey LLP (57) ABSTRACT

A surface of a workpiece is traced when a machining tool is pressed onto the surface of the workpiece under force control so as to find the positional data of the surface shape. This positional data is corrected by an error caused by a bend of a robot. The positional data is compared with the target shape of the surface, from which the burr is removed. A shift of the surface shape in the normal line direction is found. The burr generation start position, the burr generation end position and the height of the burr are found by the shift start position, the shift end position and the shift size. A machining program is made which is composed of a pass connecting the burr end position with the burr start position and also composed of a cutting pass for removing the burr, and the thus made machining program is executed. As the burr position is found and the burr is removed when the machining tool is moved to the burr position, the burr can be effectively removed.

7 Claims, 3 Drawing Sheets

U.S. PATENT DOCUMENTS

2003/0120377 A1 * 6/2003 Hooke et al. ............... 700/195

FOREIGN PATENT DOCUMENTS

| | | | |
|---|---|---|---|
| JP | 63-196374 | | 8/1988 |
| JP | 63196367 A | * | 8/1988 |
| JP | 4-122546 | | 4/1992 |
| JP | 6-8130 | | 1/1994 |
| JP | 6-312344 | | 11/1994 |
| JP | 6-312345 | | 11/1994 |
| JP | 2004-50300 | | 2/2004 |

OTHER PUBLICATIONS

Notice of Reasons for Rejection issued in corresponding Japanese Patent Application No. 2004-237476, mailed on Jun. 12, 2007.
Chinese Patent Office Action, mailed Sep. 21, 2007 and issued in corresponding Chinese Patent Application No. 200510090821X.

* cited by examiner

FINISHING MACHINE

BACKGROUND OF THE INVENTION

1. Field of the Invention

The present invention relates to a finishing machine for removing a burr, from a surface of a workpiece such as a mechanical part, by a robot.

2. Description of the Related Art

Concerning methods of removing a burr from a workpiece such as a mechanical part, a method of automatically removing the burr by a robot is known. According to the method, under the condition that the workpiece is fixed at a predetermined position, a machining tool for removing the burr is attached to the robot. Next, by means of pressure control, in which a mechanical floating mechanism operated by a spring or pneumatic pressure is used, or by means of pressure control in which software is used, while the machining tool is being pushed onto a surface of a workpiece, on which the burr is formed, at a predetermined force, the surface of the workpiece, on which the burr is formed, is moved so that the burr can be removed. The following method is also employed. Under the condition that the machining tool for removing the burr is fixed at a predetermined position, the workpiece is held by the robot, and while the workpiece is being pushed onto the machining tool for removing the burr at a predetermined force, the workpiece is moved so that the burr can be removed from the workpiece.

The size of the burr formed on the workpiece is not constant, that is, the size and the position of the burr formed on the workpiece are different for each individual workpiece. In the case where the size of the burr is relatively large, this burr cannot be removed by one cutting action for burr removing. In this case, it is necessary to change the depth of cut of the burr and conduct the burr cutting action a plurality of times. Conventionally, on the assumption that the burr, the size of which is relatively large, is formed on the workpiece surface, the burr removing action or cutting action is conducted a plurality of times. In this case, even when only a burr, the size of which is relatively small, is formed, the burr removing action is conducted on the workpiece by a plurality of times. As a result, useless burr removing actions may be conducted.

Further, in the burr removing action, the burr is cut while the machining tool is being pushed onto the workpiece by a predetermined force. Therefore, the machining tool is pushed to a portion, which does not need to be cut, in the cutting action. Accordingly, there is a possibility that overcut portions of the workpiece may be generated.

It is an object of the present invention to provide a finishing machine by which the useless burr removing action is reduced and further the overcutting of a workpiece is prevented.

SUMMARY OF THE INVENTION

According to aspect 1 of the present invention, there is provided a finishing machine for finishing a workpiece, which is arranged outside a robot, by the robot attached to a machining tool so that a shape of the workpiece can be close to a target shape, comprising: a force measurement means for measuring a force acting between the machining tool and the workpiece; a tracer control means for tracing a surface of the workpiece by using the force measurement means while the machining tool is being pushed onto the workpiece at a predetermined force; a surface shape acquisition means for acquiring a surface shape of the workpiece when a contact position of the machining tool with the workpiece is calculated from the position and posture of the machining tool, which is executing the tracing operation by the tracer control means, and the result of this calculation is recorded; a comparing means for comparing the surface shape of the workpiece, which has been acquired by the surface shape acquisition means, with the target shape; and a machining means for machining the workpiece while the position of the machining tool is being controlled so that the workpiece shape can be close to the target shape according to the result of comparison made by the comparison means.

Aspect 2 of the present invention is different to aspect 1. The aspect 2 provides a finishing machine for finishing a workpiece in such a manner that the workpiece is held by a robot and pressed to a machining tool arranged outside the robot and finishing work is conducted so that a shape of the workpiece can be close to a target shape. The other points are the same as those of Embodiment 1.

According to aspect 3 of the present invention, the machining means finds a start position and an end position of the burr, in which a difference between the initial surface shape and the target shape of the workpiece exists, and also finds a height of the burr by a tracing passage obtained by the tracer control means according to the result of the comparison made by the comparison means and, further, the machining means finds a cutting movement pattern for removing the burr so as to move from the starting position to the ending position of the burr according to the height of the burr and the setting depth of a cut after the machining tool is moved from the ending position to the next starting position of the burr, and furthermore the machining means makes and executes a machining program for removing the burr according to the cutting movement pattern.

According to aspect 4 of the present invention, the force measurement means is a force sensor attached to the robot, and the finishing machine operates while the machining tool and the workpiece are positively in contact with each other when force control is conducted, using the force sensor, in the process of executing tracer control.

According to aspect 5, a force in the pushing direction is detected by the force sensor in the process of tracer control, and the contact position of the machining tool with the workpiece is corrected and recorded according to a flexure of the robot estimated by the detected force in the pushing direction.

According to aspect 6, the machining tool is pressed onto an object, the position of which has been previously known, the contact position is recorded, the machining tool is pressed onto the same object after it has been used for a predetermined period of time, the contact position is recorded, an abrasion of the machining tool is found by comparing the first contact position with the contact position after the machining tool has been used for a predetermined period of time, the length of the machining tool is corrected according to the thus found abrasion, and the contact position of the machining tool with the workpiece is found.

In the present invention, machining is conducted in such a manner that the position of the burr is found and the burr is removed from the position. Therefore, the finishing work can be effectively conducted.

These and other objects, features and advantages of the present invention will be more apparent in light of the detailed description of exemplary embodiments thereof as illustrated by the drawings.

DETAILED DESCRIPTION OF THE INVENTION

Referring to the drawings, an embodiment of the present invention will be explained below.

Figure 1:
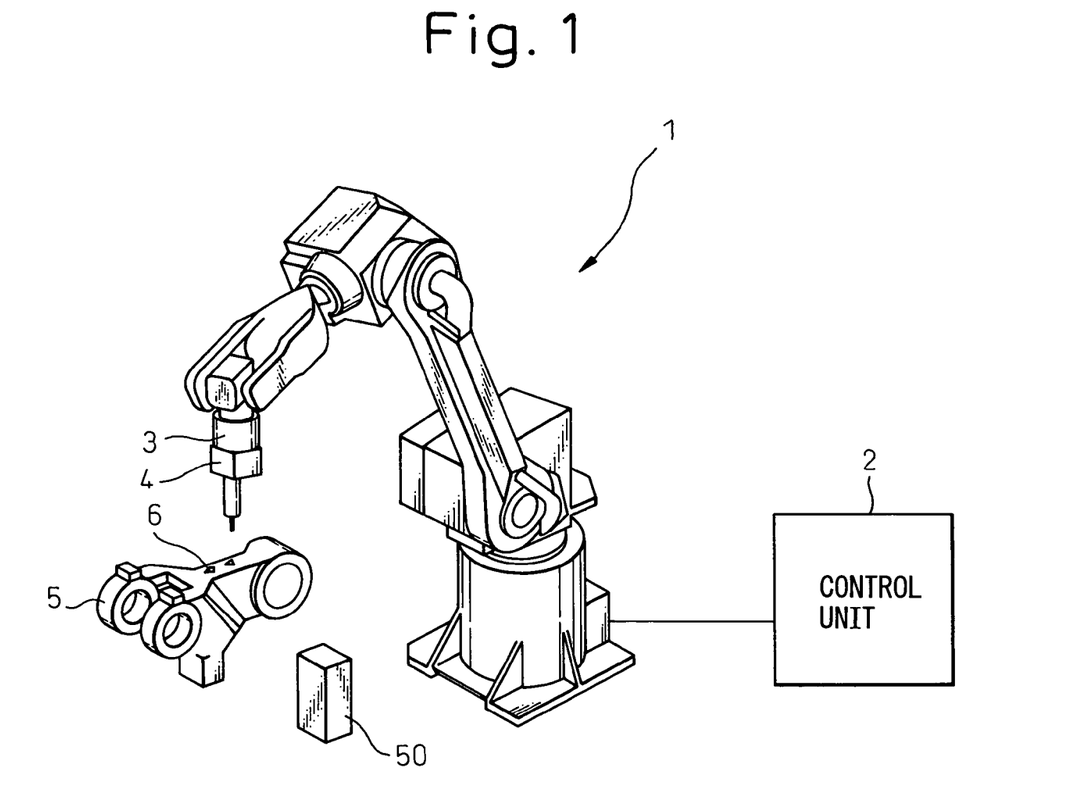
FIG. 1 is a view showing an outline of an embodiment of the present invention.

FIG. 1 is a view showing an outline of an embodiment of the present invention. In this embodiment, the workpiece 5, such as a mechanical part, is fixed at a predetermined position on a working table (not shown), and the machining tool 4 is attached to a forward end portion of the arm of the robot body 1 via the force sensor 3. The finishing machine of the present invention removes the burr 6 of the workpiece 5 using this machining tool 4. In this connection, in FIG. 1, reference numeral 2 indicates a robot control unit. The robot body 1 is controlled and driven by this control unit 2. The machining tool 4 is of the type in which the cutting blade is rotated. This machining tool 4 is also controlled and driven by this control unit 2.

The force sensor 3 measures a pushing force of the machining tool 4 when machining is being conducted or the surface shape of the workpiece 5 is being traced. However, instead of using this force sensor 3, the pushing force of the machining tool 4 may be estimated from an electric current flowing in the motor to drive each shaft of the robot. Alternatively, the following method may be adopted. The machining tool 4 is fixed at a predetermined position except for the robot 1. Under the condition that the workpiece 5 is held by the robot body 1, while the workpiece 5 is being pushed to the machining tool 4 by a predetermined force, the workpiece 5 may be moved by the robot body 1.

Figure 2:
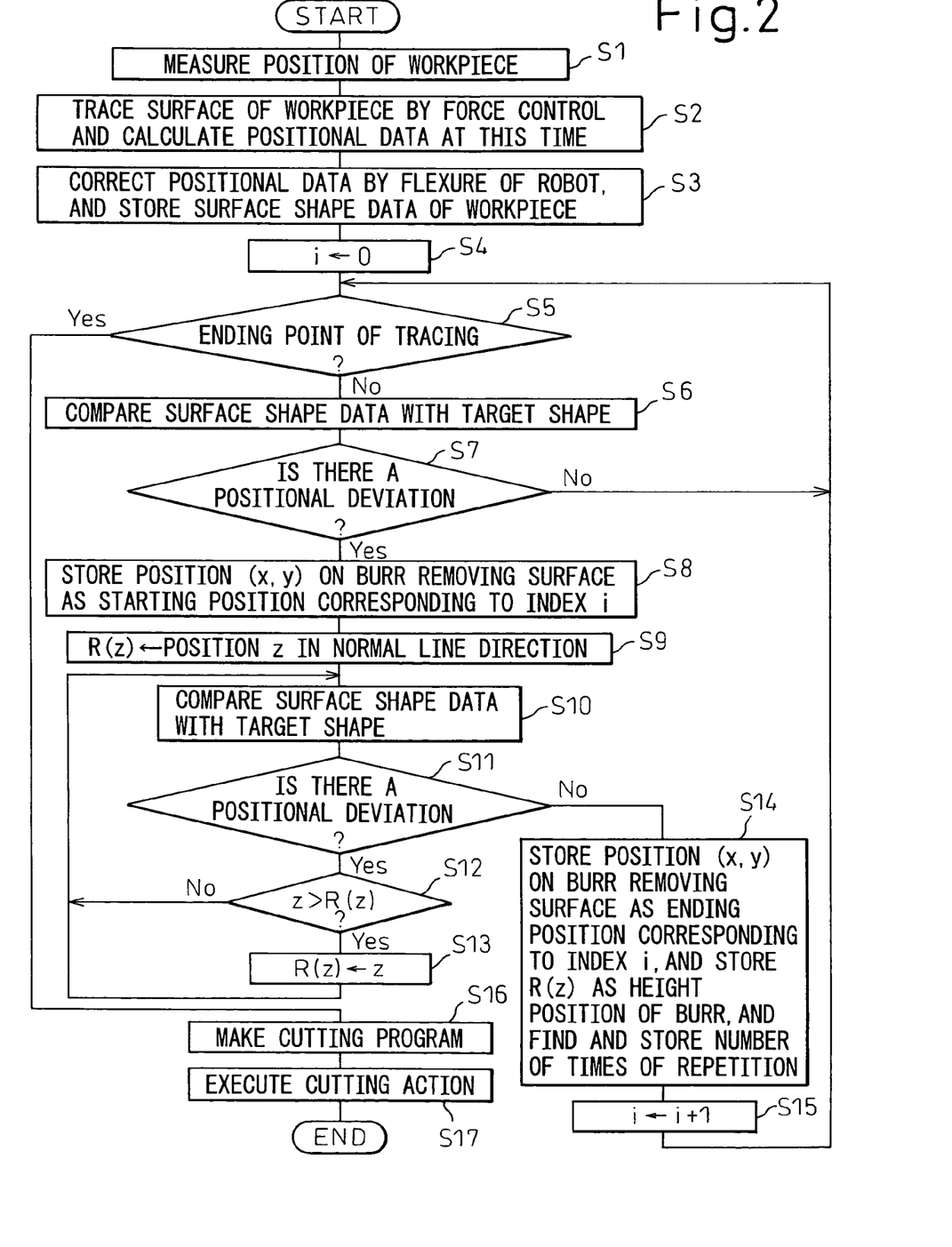
FIG. 2 is a flow chart showing a finishing process conducted in the embodiment.
Figure 4:
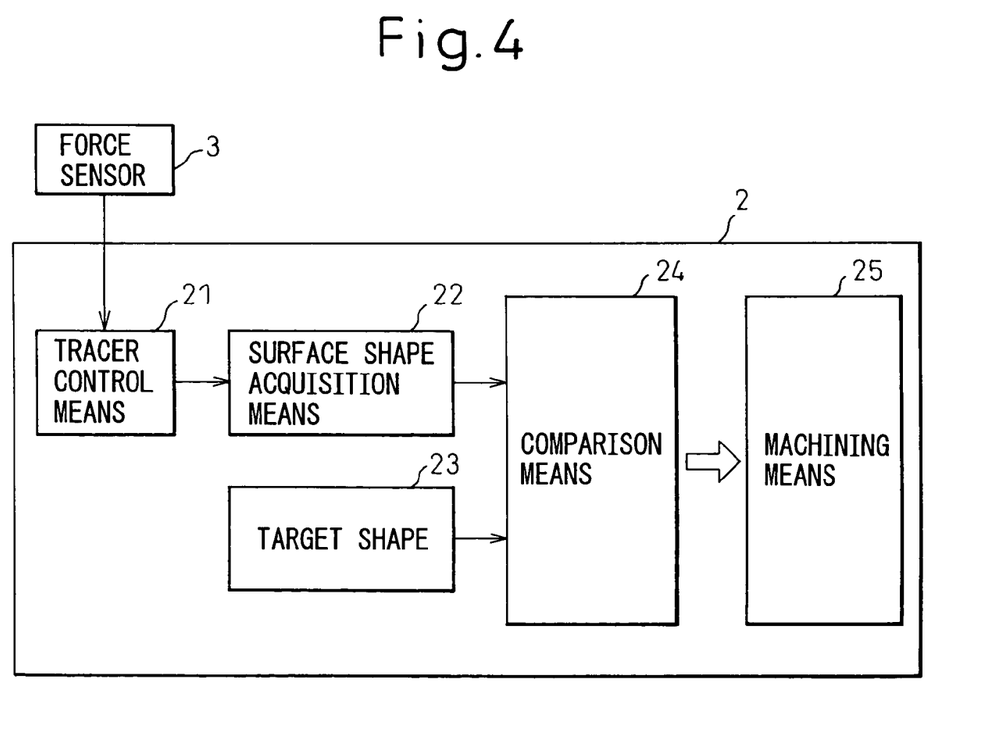
FIG. 4 is a block diagram showing an embodiment of the present invention.

In the case where finishing work is conducted so as to remove the burr 6 from the workpiece 5, the workpiece 5 is set at a predetermined position on the working table. Under the condition that the machining tool 4 is attached to the forward end portion of the robot arm, the control unit 2 executes the finishing process shown in FIG. 2, so that the finishing work can be started. In this connection, as shown in FIG. 4 which is a block diagram of an embodiment of the present invention, the target shape 23 (the final shape obtained by the finishing work) of the workpiece 5 is previously found from CAD data and stored in the control unit 2 of the robot. The route (the moving pass or the passage for moving) of tracing a surface of the workpiece 5 to remove the burr is also previously made from CAD data of the target shape 23 and taught to the control unit 2 of the robot. In this connection, when the flow chart shown in FIG. 2 is explained, reference should be appropriately made to the block diagram of FIG. 4.

First, the position of the workpiece 5 is measured (step S1). This positional measurement of the workpiece 5 is conducted as follows. An image of the workpiece 5 is obtained by a camera of a visual sensor arranged at a predetermined position. From the thus obtained image, a deviation between the position of the workpiece 5 and the reference position for the workpiece 5 is found. By this deviation, the position and posture of the workpiece 5 are found. In this connection, the following method may be adopted. A camera of a visual sensor is attached to the robot body 1. The camera is positioned at a predetermined position. An image of the workpiece 5 is obtained by this camera.

Next, in the non-cutting state in which the rotation of the machining tool 4 is stopped, while the machining tool 4 is being pressed onto a surface of the workpiece 5, from which the burr is removed, at a predetermined force, the surface, from which the burr is removed, is traced using the tracer control means 21 of the control unit 2. When the machining tool 4 is pressed onto the surface, from which the burr is removed, at a predetermined force, a detection value detected by the force sensor 3 is supplied to the tracer control means 21. By the tracer control conducted by the tracer control means 21, the positional data of the surface, from which the burr is removed, can be obtained (step S2). By using the deviation between the position of the workpiece 5, which was found in step S1, and the reference position of the workpiece 5, the tracing route (the moving pass), which has been taught, is corrected. Along the thus corrected tracing route, the surface, from which the burr is removed, is traced. In this connection, in the case where the route of tracing is not stored together with CAD data of the target shape 23, the route of tracing may be set by teaching the teaching point for forming the route of tracing to the surface, from which the burr is removed, of the workpiece 5, and the tracing action may be conducted according to the thus set route of tracing.

In this tracing action, the surface, from which the burr is removed, of the workpiece 5 is traced as follows. Under the condition that the rotation of the machining tool 4 is stopped, in the same manner as that of the conventional burr removing action, while the machining tool 4 is giving a predetermined force to the workpiece 5 using the force control, when the machining tool 4 moves in the taught route, the surface, from which the burr is removed, of the workpiece 5 is traced. In this case, while the surface, from which the burr is removed, of the workpiece 5 is being pushed, the machining tool 4 is moved and no cutting is conducted. Therefore, at the position on the surface, on which the burr is formed, of the workpiece 5, a position in the pushing direction (the direction of the normal line of the surface from which the burr is removed) at the forward end point (referred to as TCP hereinafter) of the machining tool 4 is changed. In the following explanations, the surface, from which the burr is removed, on the workpiece 5 is defined as plane XY. In the case where no burr 6 exists on the plane, a value in the direction of Z-axis, which is the normal line direction of plane XY, is a constant value and not changed. However, in the case where the burr 6 exists, the coordinate value of Z-axis is changed. Due to the foregoing, it is possible to detect a position where the burr 6 exists.

That is, the positional data of the surface, from which the burr is removed, of the workpiece 5 is obtained as follows. The robot body 1 is driven, and while the machining tool 4 is being moved along the taught route of tracing, TCP position is found for a predetermined period through the rotary angle of the motor at each joint of the robot body. Next, a position of TCP on the orthogonal coordinates (X-axis, Y-axis and Z-axis) is found from the length of each link of the robot body and the length of machining tool 4 etc. by direct transformation. Due to the foregoing, the positional data of the surface, from which the burr is removed, of the workpiece 5 is obtained. In this connection, if the machining tool 4 is used over a long period of time, a portion of the machining tool 4 contacted with the workpiece is gradually abraded. Therefore, the position of TCP, which is calculated, is changed by this abrasion, and a deviation is caused between the obtained surface shape and the true surface shape. Therefore, at the time of first starting to use the machining tool 4, the machining tool 4 is previously pressed to the predetermined member 50, the position of which is already known, and the contact position is stored as a reference value. After the machining tool 4 has been used for a predetermined period of time, the machining tool 4 is pressed onto the same predetermined member 50 at the same force and the contact position is found. Then, an abrasion of the machining tool 4 is found from the contact position and the stored reference position. Next, the length of the machining tool 4, which is used in the direct transformation for finding TCP position (x, y, z) of the orthogonal coordinates from the motor angle of each robot joint, is corrected according to this abrasion.

As the machining tool 4 is pressed to the workpiece 5 by a predetermined force, the robot is flexed, and the detected positional data of TCP includes this flexure. A positional deviation caused by this flexure is found as follows.

A flexure deviation $\delta(=Kx \cdot Fx, Ky \cdot Fy, Kz \cdot Fy)$ in the translational direction is found from the spring constant K (The spring constants of the robot in the directions of X-axis, Y-axis and Z-axis are represented by Kx, Ky and Kz respectively.) of the robot and the pushing force F (The pressing forces in the directions of X-axis, Y-axis and Z-axis are represented by Fx, Fy and Fz respectively.) detected by the force sensor 3. The positional data of the surface shape found in step S2 is corrected by this flexure deviation $\delta$. The thus corrected positional data is stored as positional data of the surface shape from which the burr is removed (step S3). The processing is conducted by the surface shape acquisition means 22 of the control unit 2.

The positional data of the surface shape, from which the burr is removed, obtained by the surface shape acquisition means 22 in this way and the target shape 23 of CAD data corresponding to the surface shape of the target shape 23, which is previously set and stored, are compared with each other by the comparison means 24 of the control unit 2. By the comparison means 24, in the normal line direction (the direction of Z-axis) of the plane of the plane shape, from which the burr is removed, a position, at which a positional deviation exists between the positional data of the surface shape, which is obtained by the surface shape acquisition means 22, and the positional data of the target shape 23, is detected, that is, a position of the burr is detected. First, the index i is set at "0" (step S4), and the surface shape data, which was found in step S3, is read out from the trace starting point in the tracing direction, and it is judged whether or not the data exists (step S5). In the beginning, the data exists. Therefore, the Z-coordinate value of the XY plane position of the burr removing plane (the tracing plane) of the positional data and Z-axis-coordinate value of the positional data of the target shape 23 corresponding to the XY plane position are compared with each other (step S6), and it is judged whether or not a difference exists, that is, it is judged whether or not a positional deviation exists (step S7). In the case where no positional deviation exists, the program returns to step S5, and the next surface shape data is read out. In the same manner, the surface shape data and the target shape 23 data are compared with each other, and it is judged whether or not the deviation exists in the Z-axis-coordinate value, that is, it is judged whether or not the burr 6 exists.

In the case where it is judged in step S7 that the deviation exists in the Z-axis-coordinate value, that is, it is judged in step S7 that the burr 6 exists, the position (x, y) of the surface, from which the burr is removed, is defined as the burr removing starting position and stored corresponding to the index i (step S8). In addition, Z-axis-coordinate value at this time is stored in a register R (z) (step S9). Successively, the next surface shape data is read out. In the same manner, the data of the target shape 23 and the shape data of the surface, from which the burr is removed, are compared with each other by the comparison means 24 (step S10). In the case where the Z-axis-coordinate values are different and shifted from each other (step S11), the Z-axis-coordinate value of the surface shape data, which has been read out, and the value stored in the register R (z) are compared with each other (step S12). When the Z-axis-coordinate value of the surface shape data, which has been read out, is higher than the value stored in the register R (z), this Z-axis-coordinate value is included in the register R (z) (step S13), and the program is returned to step S10. In the case where the value stored in the register R (z) is higher than the Z-axis-coordinate value of the surface shape data which has been read out, the register R (z) is not rewritten, and the program is returned to step S10. In this connection, a direction directed upward from the burr removing surface is defined as the positive direction of the Z-axis.

As long as the positional deviation continues, processing from step S10 to step S13 is repeatedly executed, and the highest Z-axis-coordinate value is stored in the register R (z). That is, the register R (z) stores a position, at which the burr 6 is highest. When no deviation is detected in step S11, corresponding to the index i, the position (x, y) of the burr removing plane at this time is stored as the burr removing ending position, and the Z-axis-coordinate value, which is stored in the register R (z), is also stored. Further, the height of the burr 6 is found from the Z-axis-coordinate value, and the number of times of cutting to remove the burr 6 is calculated and stored (step S14).

Figure 3:
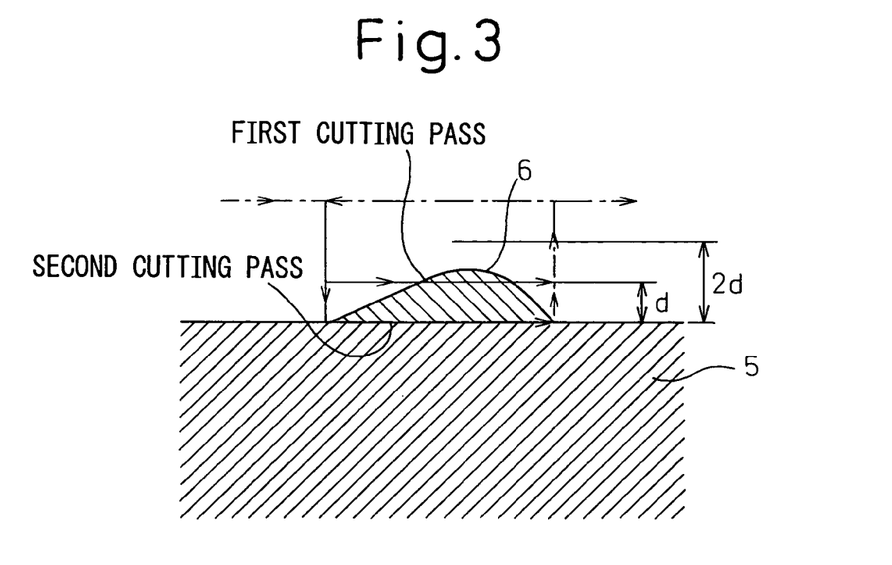
FIG. 3 is a schematic illustration showing a method of finding the number of times of cutting for removing the burr and also showing a method of removing the burr.

FIG. 3 is a schematic illustration showing a method of finding the number of times of cutting for removing the burr 6 and also showing a method of removing the burr 6.

The height of the burr 6 is found on the basis of the difference $\Delta z$ between the Z-axis-coordinate value, which is stored in the register R (z), and the Z-axis-coordinate value of the target shape 23. The height $\Delta z$ of the burr 6 is divided by the depth d of cut of the tool which is previously set, and the integer obtained by rounding up the fractional portion of $\Delta z/d$ is decided to be the number of times of cutting (the value obtained by rounding up the fractional portion of $\Delta z/d$). FIG. 3 is a view showing a pattern in the case of removing the burr 6 by the cutting action conducted twice.

In this way, after the burr generating position, the burr ending position, the height of the burr 6 and the number of times of repetition of cutting are stored corresponding to the index i, the index i is incremented by 1, and the program returns to step S5 and the processing after step S5 is conducted.

In this way, the burr generating position, the burr ending position, the height of the burr 6 and the number of times of repetition of cutting are stored for each index i. In step S5, when it is detected that all the surface shape position data has been processed and the burr detection has been completed with respect to the entire surface shape, the program proceeds to step S16. In step S16, the burr removing starting position, the burr removing ending position and the number of times of cutting are successively read out from "0" of the index i so that the approach pass to the starting position is found. Further, in step S16, the cutting pass pattern from the cutting starting position to the cutting ending position is made. After that, the withdrawal pass from the cutting ending position is made, and the approach pass to the burr removing starting position to be stored in the next value to the index i is made. This work is done by the number of pieces of burr stored corresponding to the index i so as to make the cutting program (step S16).

In this connection, in this embodiment, when the number of times of cutting is n, the first cutting depth position is set at a position higher than the shape plane (the Z-axis coordinate value of the target shape 23) by $(n-1) \cdot d$. After that, cutting is conducted from the cutting starting position to the cutting ending position under the condition that the cutting depth is successively increased by d, and the cutting pattern including the return pass is done. In FIG. 3, the broken line represents a quick traverse pass, and the solid line represents a cutting pass. According to the thus made cutting program, the cutting action is executed (step S17). In this connection, steps S8, S9 and steps S12 to S17 are conducted by the machining means 25 of the control unit 2. That is, the machining means 25 instructs machining while the position of the machining tool 4 is being controlled so that the workpiece 5 can be close to the above target shape according to the result of the comparison made by the comparison means 24.

In this connection, in the above embodiment, the workpiece 5 is fixed at a predetermined position, the machining tool 4 is attached to a forward end portion of the robot arm, and the burr removing work is executed when the robot is driven. On the contrary, the machining tool 4 may be fixed at a predetermined position, the workpiece 5 may be held by the robot, and the burr removing work may be executed when the workpiece 5 is relatively moved with respect to the machining tool 4. In this case, the processing of steps S1 and S2 shown in FIG. 2 is corrected as follows. The workpiece 5 is held by the robot, the robot is moved to a predetermined position, an image of the workpiece 5, which is held, is obtained by a camera of the visual sensor arranged as a predetermined position, and a tracing passage, which has been taught, is corrected when a shift of the holding position of the workpiece 5 is found. The other points are the same as those of processing shown in FIG. 2.

Although the invention has been shown and described with exemplary embodiments thereof, it should be understood, by those skilled in the art, that the foregoing and various other changes, omissions and additions may be made therein and thereto without departing from the spirit and the scope of the invention.

The invention claimed is:

1. A finishing machine for finishing a workpiece, which is arranged outside a robot, by the robot attached to a machining tool so that a shape of the workpiece can be close to a target shape, comprising:
a force measurement means for measuring a force acting between the machining tool and the workpiece;
a tracer control means for tracing a surface of the workpiece by using the force measurement means while the machining tool is being pushed onto the workpiece at a predetermined force;
a surface shape acquisition means for acquiring a surface shape of the workpiece when a contact position of the machining tool with the workpiece is calculated from the position and posture of the machining tool, which is executing the tracing operation by the tracer control means, and the result of this calculation is recorded;
a comparing means for comparing the surface shape of the workpiece, which has been acquired by the surface shape acquisition means, with the target shape; and
a machining means for machining the workpiece while the position of the machining tool is controlled so that the workpiece shape becomes close to the target shape according to the result of comparison made by the comparison means,
wherein the force measurement means is a force sensor attached to the robot, and the finishing machine operates while the machining tool and the workpiece positively come into contact with each other when force control is conducted using the force sensor in the process of executing tracer control; and
wherein a force in the pushing direction is detected by the force sensor in the process of tracer control, and the contact position of the machining tool with the workpiece is corrected and recorded according to a flexure of the robot estimated by the detected force in the pushing direction.

2. A finishing machine for finishing a workpiece, which is held by a robot, by pressing it to a machining tool arranged outside the robot so that a shape of the workpiece can be close to a target shape, comprising:
a force measurement means for measuring a force acting between the machining tool and the workpiece;
a tracer control means for making a surface of the workpiece conduct tracing with respect to the machining tool by using the force measurement means while a surface of the workpiece is being pressed to the machining tool at a predetermined force;
a surface shape acquisition means for acquiring a surface shape of the workpiece when a contact position of the machining tool with the workpiece is calculated from the position and posture of the machining tool, which is executing the tracing operation by the tracer control means, and the result of this calculation is recorded;
a comparing means for comparing the surface shape of the workpiece, which has been acquired by the surface shape acquisition means, with the target shape; and
a machining means for machining the workpiece so that the workpiece shape becomes close to the target shape according to the result of comparison made by the comparison means.

3. A finishing machine according to claim 1, wherein
the machining means finds a start position and an end position of the burr, in which a difference between the initial surface shape and the target shape of the workpiece exists, and also finds a height of the burr by a tracing passage obtained by the tracer control means according to the result of the comparison made by the comparison means,
the machining means finds a cutting movement pattern for removing the burr so as to move from the start position to the end position of the burr according to the height of the burr and the setting depth of cut after the machining tool is moved from the end position to the next start position of the burr, and
the machining means makes and executes a machining program for removing the burr according to the cutting movement pattern.

4. A finishing machine according to claim 1, wherein the machining tool is pressed to an object, the position of which has been previously known, the contact position is recorded, the machining tool is pressed to the same object after it has been used for a predetermined period of time, the contact position is recorded, an abrasion of the machining tool is found by comparing the first contact position with the contact position after the machining tool has been used for the predetermined period of time, the length of the machining tool is corrected according to the thus found abrasion, and the contact position of the machining tool with the workpiece is found.

5. A finishing machine according to claim 2, wherein
the machining means finds a start position and an end position of the burr, in which a difference between the initial surface shape and the target shape of the workpiece exists, and also finds a height of the burr by a tracing passage obtained by the tracer control means according to the result of the comparison made by the comparison means, the machining means finds a cutting movement pattern for removing the burr so as to move from the start position to the end position of the burr according to the height of the burr and the setting depth of cut after the machining tool is moved from the end position to the next start position of the burr, and the machining means makes and executes a machining program for removing the burr according to the cutting movement pattern.

6. A finishing machine according to one of claims 3, wherein the force measurement means is a force sensor attached to the robot, and the finishing machine operates while the machining tool and the workpiece positively come into contact with each other when force control is conducted using the force sensor in the process of executing tracer control.

7. A finishing machine according to claim 1, wherein the machining tool is pressed to an object, the position of which has been previously known, the contact position is recorded, the machining tool is pressed to the same object after it has been used for a predetermined period of time, the contact position is recorded, an abrasion of the machining tool is found by comparing the first contact position with the contact position after the machining tool has been used for the predetermined period of time, the length of the machining tool is corrected according to the thus found abrasion, and the contact position of the machining tool with the workpiece is found.

* * * * *

UNITED STATES PATENT AND TRADEMARK OFFICE
CERTIFICATE OF CORRECTION

| | | |
|---|---|---|
| PATENT NO. | : 7,534,077 B2 | Page 1 of 1 |
| APPLICATION NO. | : 11/204225 | |
| DATED | : May 19, 2009 | |
| INVENTOR(S) | : Kazunori Ban et al. | |

It is certified that error appears in the above-identified patent and that said Letters Patent is hereby corrected as shown below:

Column 9, Line 10, change "one of claims 3," to --claim 1,--.

Signed and Sealed this

Sixth Day of October, 2009

David J. Kappos
*Director of the United States Patent and Trademark Office*